May 21, 1968  LE ROY B. NELSON  3,383,742
MACHINE FOR MAKING CONCRETE PIPES
Filed Nov. 30, 1964  5 Sheets-Sheet 1
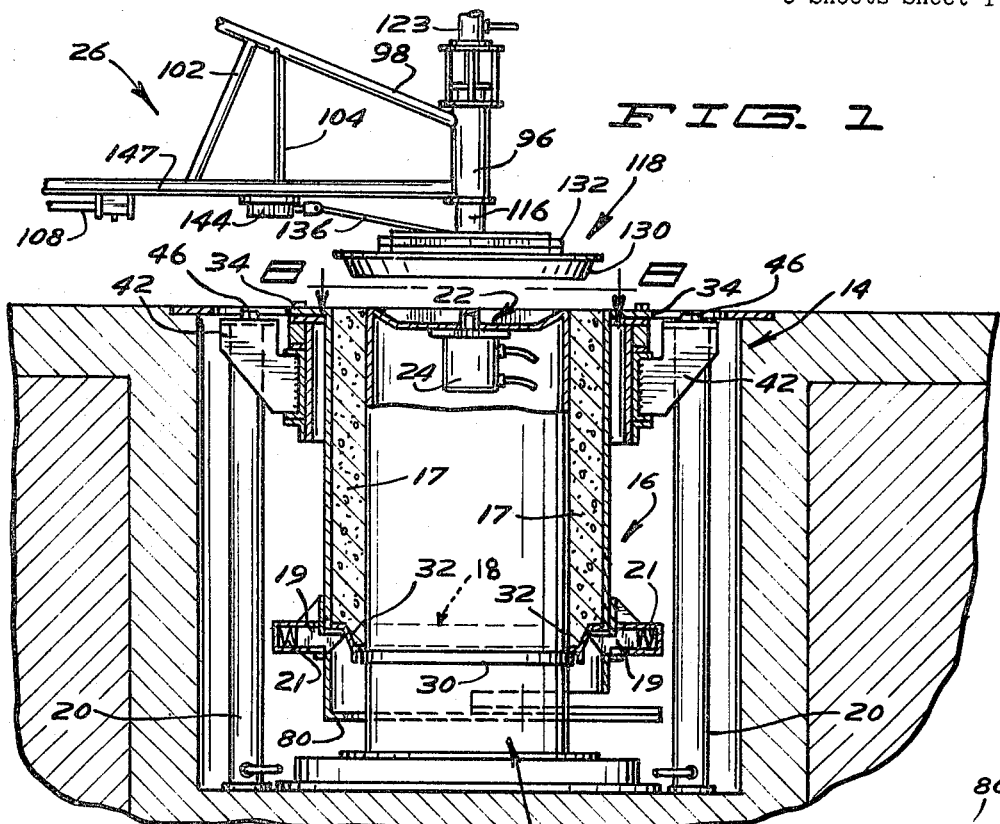
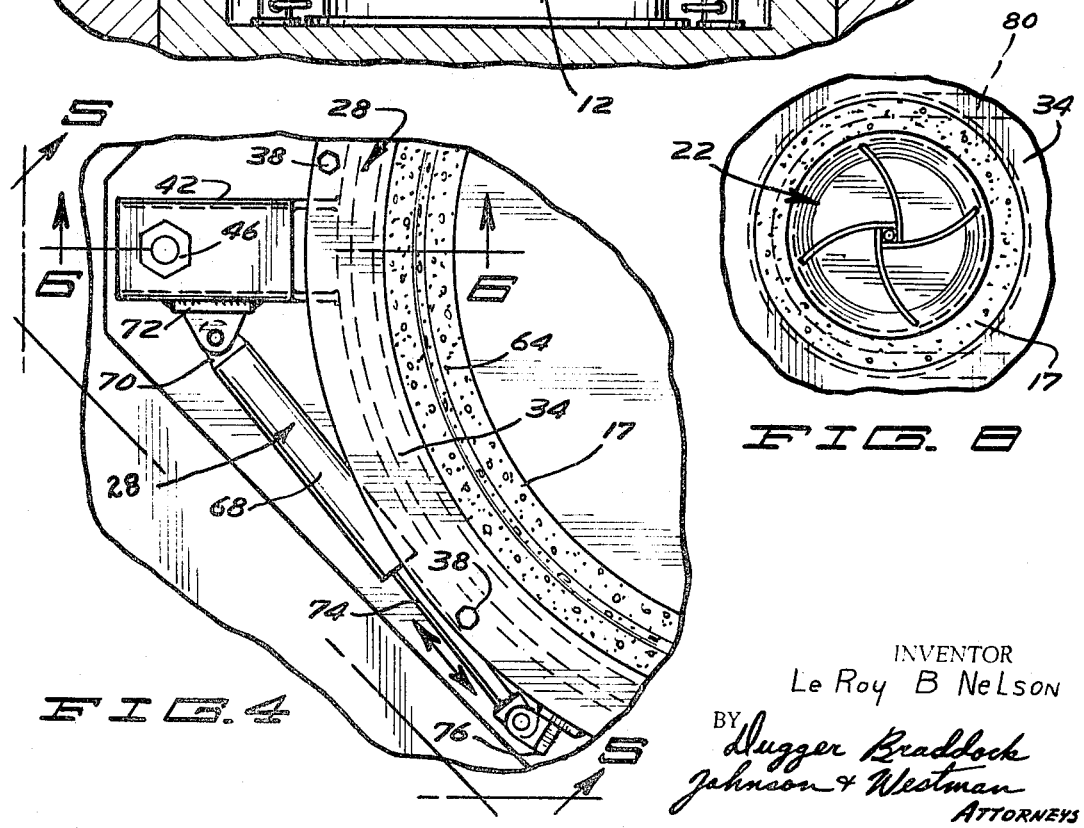
INVENTOR
Le Roy B Nelson
BY Dugger Braddock
Johnson & Westman
ATTORNEYS May 21, 1968                    LE ROY B. NELSON                    3,383,742
                         MACHINE FOR MAKING CONCRETE PIPES
Filed Nov. 30, 1964                                              5 Sheets-Sheet 2
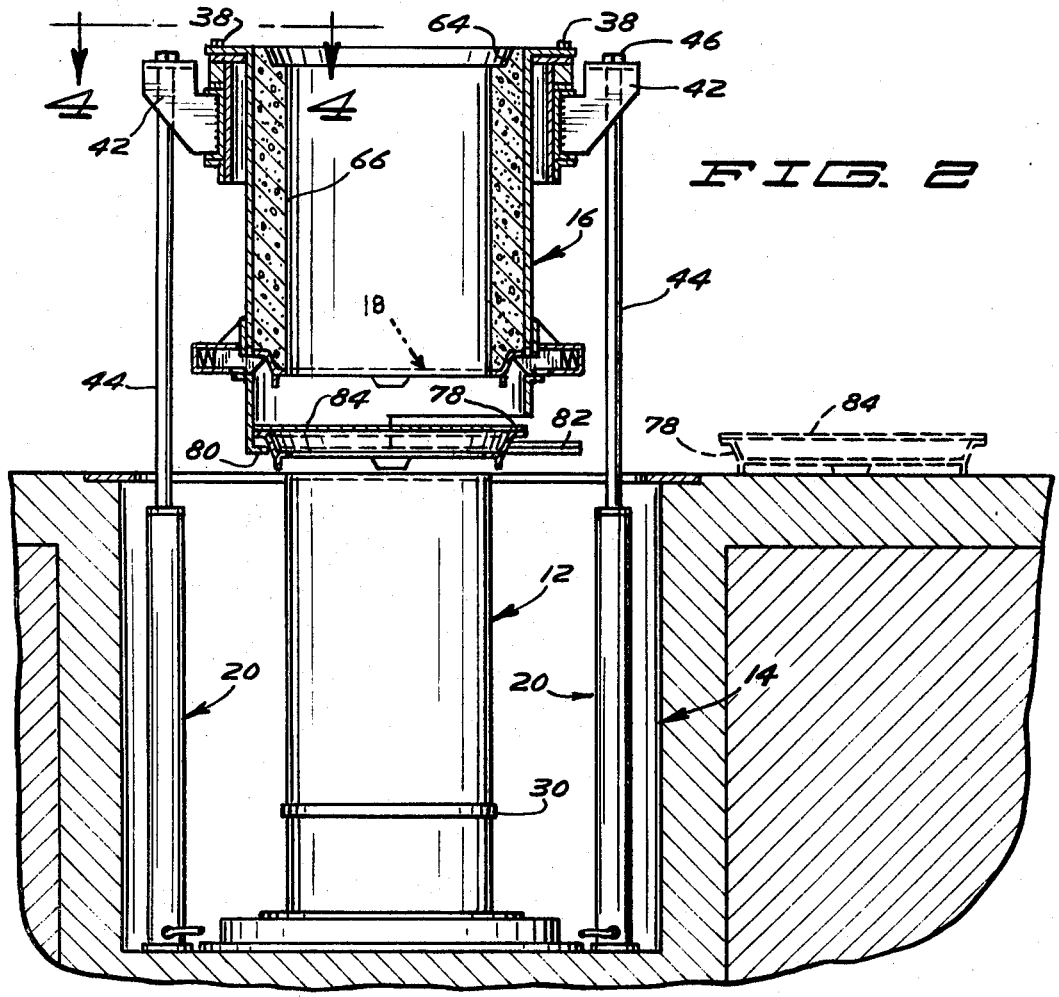
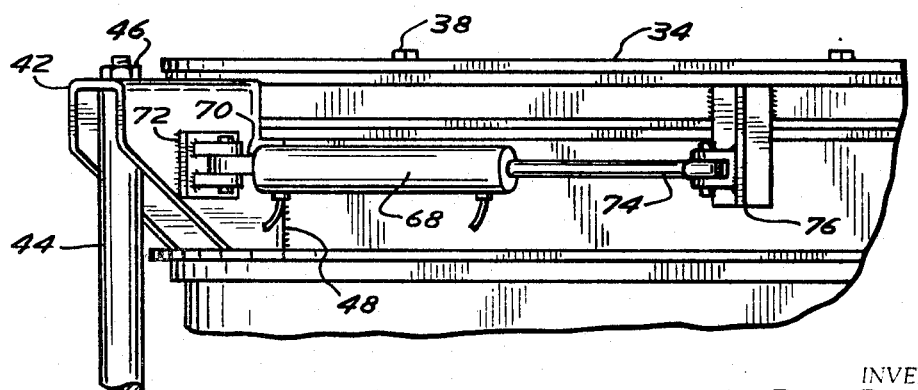
INVENTOR
Le Roy B Nelson May 21, 1968
LE ROY B. NELSON
3,383,742
MACHINE FOR MAKING CONCRETE PIPES
Filed Nov. 30, 1964
5 Sheets-Sheet 3
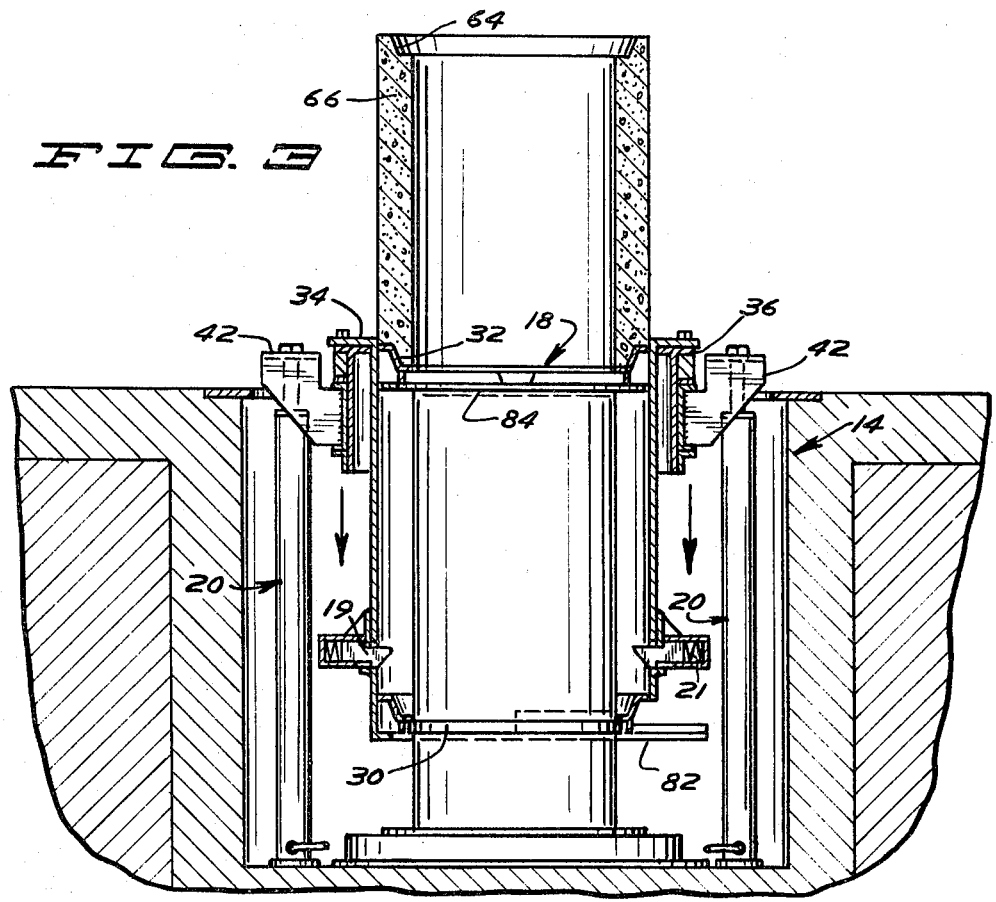
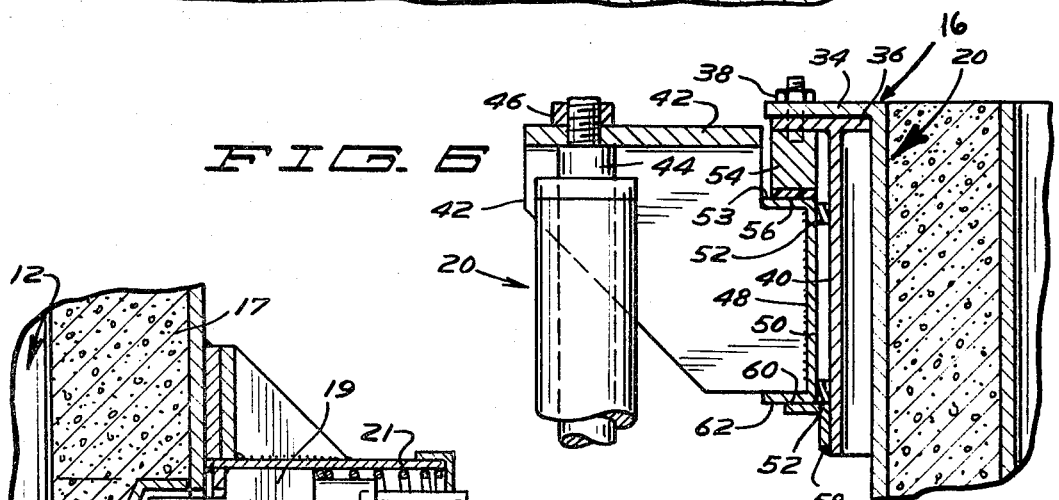
INVENTOR
Le Roy B. Nelson
BY
Dugger Braddock Johnson & Westman
ATTORNEYS

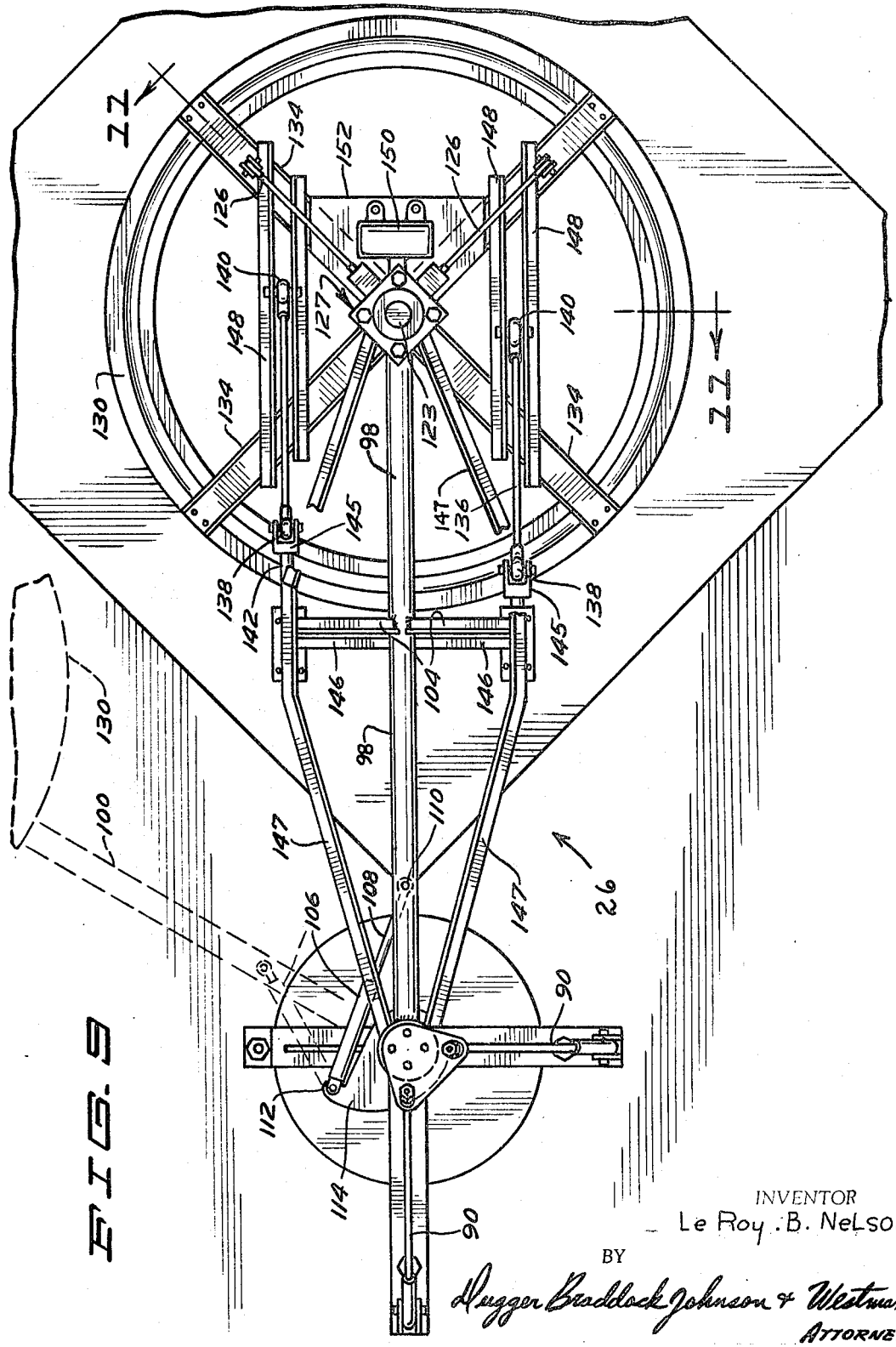

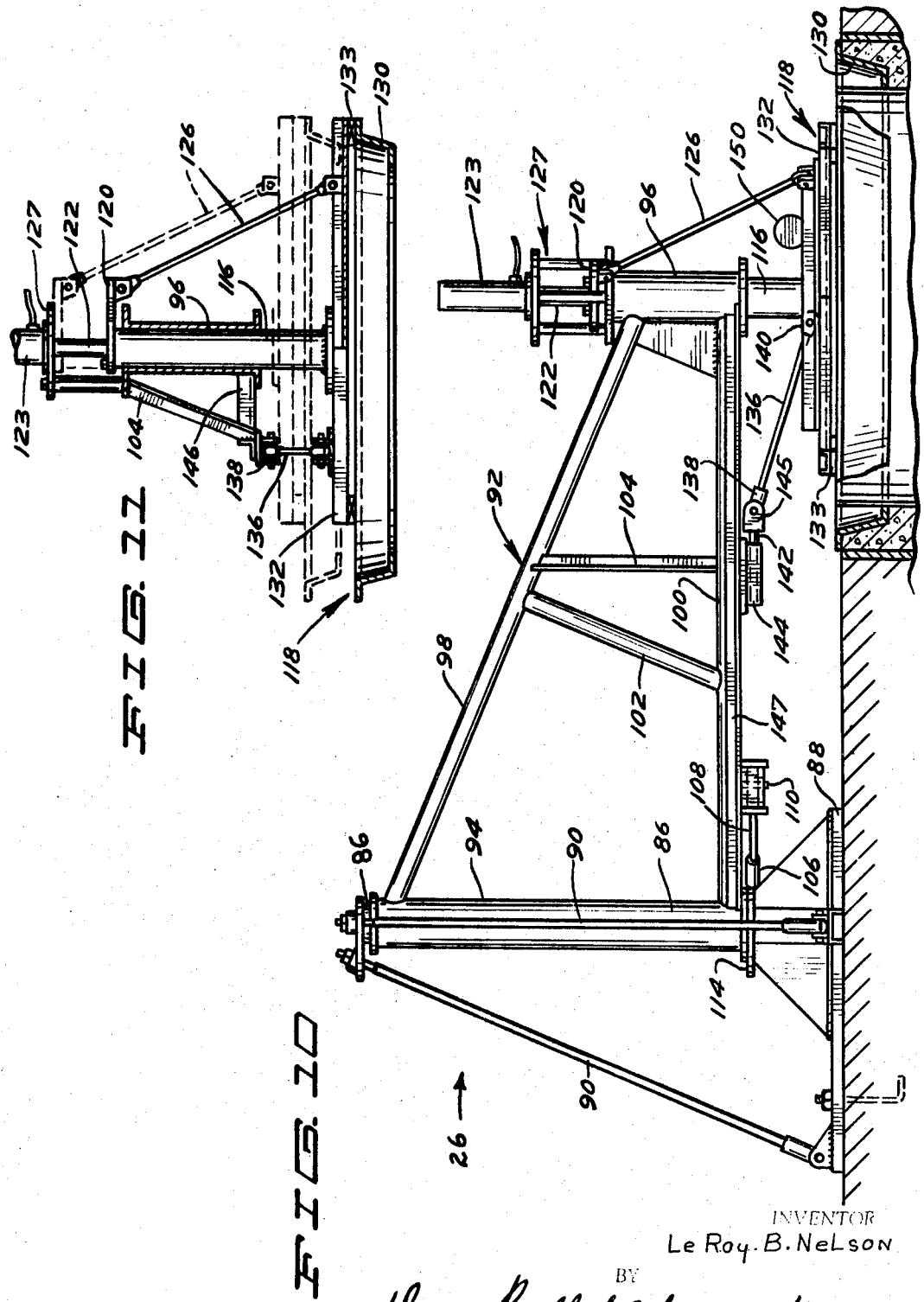

United States Patent Office 3,383,742
Patented May 21, 1968

3,383,742
MACHINE FOR MAKING CONCRETE PIPES
Le Roy B. Nelson, Minneapolis, Minn., assignor to Beloit Corporation, Beloit, Wis., a corporation of Wisconsin
Filed Nov. 30, 1964, Ser. No. 414,613
1 Claim. (Cl. 25—30)

This invention relates to a machine for molding pipes, or the like, from a mixture of cement and aggregate.

Some prior art forms of concrete pipe machines have several definite disadvantages or limitations. A typical example of these prior art machines is in that disclosed in U.S. Patent No. 2,717,435 wherein there is shown a machine incorporating a central core member, an outer casing surrounding the core member and means for vibrating the core member. The vibrating means is provided internally of the core member and is designed to consolidate the concrete mix preparatory to the forming process. The removal of a molded pipe from the mold is effected by first moving the molded pipe together with the outer casing in a longitudinal direction relative to the core member to strip the molded pipe from the core member and secondly to move the outer casing along in the opposite longitudinal direction to withdraw the same from around the molded pipe. To first strip the molded pipe from the central core, the patentee employs a lower casing or sleeve which telescopically engages the outer casing. This lower sleeve has an upper peripheral flange which abuts the molded pipe but passes over the center core, thereby stripping the pipe from the core member. A first disadvantage or limitation of the foregoing is manifested by the costly and complicated construction of the vibratory core member. In addition, maintenance problems arise because of the difficulty encountered in lubricating and servicing the vibratory means which is mounted internally of the core member. A second disadvantage stems from the fact that the outer casing is susceptible to damage since it must withstand the vibrational forces transmitted by the core member through the concrete mixture interposed therebetween. In other words, a molding machine based on the concept of using a vibratory core member has not been suitable because of its inability to isolate the outer casing from the heavy vibrations of the core member. A third important limitation of a machine of this type is the overall working space which is required to achieve the necessary displacement of the molded pipe relative to the core member, as well as the space required to achieve the relative displacement of the lower sleeve with reference to the outer casing. To fully produce a molded pipe, the machine itself must be at least twice the length of the molded pipe, and space equal to the length of the pipe must additionally be provided above the machine to permit removal of the pipe. The net result is that a machine of this type occupies a total working space equal to at least three times the length of the pipe to be formed. Other considerations as to ease of operation, durability, reliability, and production rate, go far in pointing out the disadvantages to a machine of this type, as well as other prior art concrete pipe making machines.

It is, therefore, the principal object of this invention to eliminate the shortcomings inherent in the prior art devices which are now commercially available, and to provide a molding machine for concrete pipes which is based on an entirely new method and which provides an optimum design capable of achieving this method with a minimum of parts and expense.

A second object of this invention is to provide a concrete pipe making machine which reduces the total working space to substantially twice the length of the molded article.

A third object of this invention is to provide a machine for molding concrete pipes wherein all the exterior surfaces of the pipe are subjected to a troweling action so as to achieve a final molded pipe of the highest quality.

Another object of this invention resides in the simple and easy way by which the molded article is removed from the mold and the machine is repositioned for subsequent molding.

A fifth object of this invention is to provide a vibratory means for consolidating the concrete mix, yet heavy vibrations are not transmitted directly to the main molding components of the machine.

Another object of this invention is to provide a concrete pipe machine which is operated with a minimum of manual labor.

Still further objects reside in the machine's massive capacity, its durable construction and its ability to produce at high production rates.

Other objects will become apparent as the description proceeds.

In the drawings,

FIG. 1 is a sectional view showing the molding machine in its original position after the concrete mix has been added to the mold cavity;

FIG. 2 is a similar view showing the machine in its raised position after the molded part has been stripped from the stationary core;

FIG. 3 is a view similar to FIGS. 1 and 2 showing the machine returned to its original position and after the outer jacket has been stripped from the molded pipe;

FIG. 4 is an enlarged sectional view taken along the line 4—4 of FIG. 2 and showing the detail of the oscillating mechanism for imparting partial rotation to the outer jacket;

FIG. 5 is a sectional view taken along the line 5—5 of FIG. 4;

FIG. 6 is an enlarged sectional view taken along the line 6—6 of FIG. 4;

FIG. 7 is an enlarged view showing the detail of the pawl lifting means;

FIG. 8 is a plan view showing the detail of the spiral feed slinger blade;

FIG. 9 is a plan view showing the detail of the boom header;

FIG. 10 is a side elevation of the boom header; and

FIG. 11 is a view taken along the line 11—11 of FIG. 9.

Referring to the drawings, the invention is shown broadly as comprising a stationary core 12 mounted permanently in a bottom of a pit 14, an axially slidable jacket 16 surrounding the core 12 in a spaced concentric relation so as to define the annular mold cavity 17, a pallet 18 being held by the radially slidable pawls 19 and closing the annular opening formed at the bottom of the cavity 17 between the jacket and core, and hydraulic power cylinders 20 for elevating the jacket in vertical axial displacement relative to the stationary core 12. A spiral feed slinger blade 22 driven by a motor 24 is shown mounted internally at the upper end of the stationary core 12. At 26 is shown the boom header which is forced down into the space between the core and the jacket at the top thereof in order to form the top or female end of the molded pipe. FIG. 4 illustrates the troweling mechanism 28 for partially oscillating the jacket 16 relative to the stationary core 12. Each of the foregoing components will now be described in detail in conjunction with the novel method or operational steps which are carried out in forming a concrete pipe according to this invention.

With the jacket 16 in the position as shown in FIG. 1, concrete mix is supplied in bulk on the top of the slinger blade 22 which, in conjunction with the upper end of the core 12, forms a dished portion for receiving the concrete mix therein. Subsequently, the slinger blade feeds the mix in a spiral radial direction to the peripheral edges of the core, whereupon the mix falls over the edges and into the cavity 17.

The bottom of the cavity 17 is defined by the pallet 18 which is supported by a pallet retainer ring 30 formed integrally on the outer surface of the stationary core 12. The pallet 18 preferably comprises a cast iron ring adapted to slip over the core 12 and including a peripheral flange 32, the upper surface of which forms a tongue in the lower or male end of the molded pipe.

As best seen in FIG. 6, the jacket 16 includes an upper outwardly depending flange 34 which is fixedly secured to plate 36 by retainer bolts 38. Plate 36 constitutes the cross portion of a substantially T-shaped collar 40 which surrounds the jacket 16 in spaced concentric relation therewith. The collar 40 in cooperation with the plate 36 provides a supporting structure for the jacket 16.

The numeral 42 refers generally to the U-shaped support brackets which form the interconnecting link between the jacket elevator cylinders 20 and the jacket 16. The brackets 42 are secured to the upper ends of pistons 44 by weld nuts 46 and are welded at 48 to an annular channel member 50 which is spaced slightly from the collar 40 by the small bearing blocks 52. Interposed between the plate 36 and an upper bearing surface 53 of the channel member 50 is the solid annular ring 54. The ring 54 is provided with the lower bearing surface 56 which registers with the bearing surface 53 of the channel member 50. A lower L-shaped member 58 is welded to the outer surface of the collar 40 and presents the bearing surface 60 which engages the lower bearing surface 62 of the channel member 50. The several parts are thus arranged to permit the rotation of the jacket 16 about a vertical axis with respect to the brackets 42 which necessarily remains fixed to the pistons 44. At the same time, the brackets 42 in cooperation with the channel member 50 provide means for imparting vertical axial displacement to the jacket 16. This is clear since any vertical displacement of the bracket 42 is transmitted through the linkage provided by the channel member 50, the ring 54, and plate 36 secured to the flange 32 of jacket 16. Upon reversing the displacement of the pistons 44, corresponding reverse displacement of the jacket 16 is achieved through the linkage provided by the channel member 50, the L-shaped member 58 and collar 40 which is in turn secured to the jacket 16 by the retainer bolts 38.

After the cement mix has been added and has assumed its position within the cavity 17 as shown by FIG. 1, the boom header, generally designated 26, is lowered so as to close the upper end of the cavity 17 between the jacket 16 and the core 12. The boom header will be later described in full detail, but it suffices at the present to say that the header is designed to serve a dual purpose, namely, it consolidates the cement within the cavity 17 and secondly forms the groove 64 in the upper female end of the final molded pipe 66.

The primary purpose of the troweling operation which is carried out by oscillating the jacket 16 with respect to core 12 is to produce a smooth finish on the exterior surfaces of the concrete pipe and insure against the presence of "voids" in the pipe. Oscillation of the jacket also prompts consolidation of the concrete mix within the mold cavity. As best seen in FIGS. 4, 5 and 6, the troweling mechanism 28 includes the horizontally oriented two way hydraulic cylinder 68 having a stationary end member 70 pinned to the clevis bracket 72 and a piston end 74 pinned to the clevis bracket 76. The clevis bracket 72 is in turn welded to the U-bracket 42 while the clevis bracket 76 is welded to ring 54. As hydraulic fluid is supplied intermittently to opposite ends of the cylinder 68, reciprocating motion is imparted to the piston 74 which induces oscillation of the ring 54 together with collar 40 and jacket 16. A second troweling mechanism (not shown) is similarly mounted in conjunction with the opposite U-bracket and is synchronized with the operation of the mechanism 28. There is thus provided a very simple yet effective means for partially oscillating the jacket and thus create a relatively smooth finish on the inner surfaces of the molded pipe. Normally under uniform motion the pipe will travel with the jacket and slip on the core. However, due to the sudden change of direction of oscillation of the jacket 16 and the substantial inertial forces of the molded pipe, some slippage occurs between the jacket and pipe, as well as between the molded pipe and the pallet. In short, the oscillatory movements of the jacket causes some movement of the pallet relative to the pipe, of the pipe relative to the outer jacket, and of the pipe relative to the core. However, the movement of the molded pipe relative to the core is substantially greater than that of the pipe relative to the jacket whereby the interior cylindrical surface of the pipe is troweled smooth by the wall of the core. The advantage manifested by the slippage of the pallet is that some relative motion is created between the pallet and the pipe and this effects a troweling action on the bottom or male end of the pipe. The troweling action achieved by both the jacket (slippage of the pipe on the core and on the jacket) and pallet (trowels the bottom end of the pipe) coupled with the troweling action of the boom header on the top end of the pipe, results in all exterior surfaces of the pipe being troweled. To achieve maximum troweling action, the extent of oscillation of the jacket 16 is important and is preferably in the range of 15 to 25 degrees.

After the pipe is formed, the cylinders 20 are filled with hydraulic fluid from the bottom to force pistons 44 to carry the jacket 16 to the position as seen in FIG. 2. Note that the spring loaded radially slidable pawls 19 come in contact with the underside of the pallet 18 thus to raise the pallet and pipe with the jacket and to strip the newly formed pipe 66 from the core 12.

With the parts positioned as shown in FIG. 2, an empty second pallet 78 is slid under the first pallet 18 and is held in position by a pallet lowering shelf 80 and a pallet slide 82 which are formed on the lower end of the jacket 16. The pallet lowering shelf 80 is a U shaped narrow ledge or shelf that is open on one side as shown. The ledge supports the outer edge portions of the pallet. Simultaneously with the insertion of the new pallet 78, there is inserted a disc-shaped stripper plate 84 which registers with and rests on the upper surface of the peripheral flange of the pallet 78. With the new pallet and stripper plate in position, the pistons 44 are then forced in a reverse or downward direction to lower the jacket. The pallet 78 will slide down the outside of the core 12 with the jacket until it comes to rest on the pallet retainer ring 30. Further downward movement of the jacket causes the pawls 19 to be pushed out of the way as they pass the pallet 18 and to snap back into the position as originally shown in FIG. 1 after they clear the top edge of the pallet.

While the jacket lowers, the pallet 18 and the pipe 66 also lower. The stripper plate 84 comes to rest on the top of the core 12, and as the jacket is further lowered the first pallet 18 is stopped from downward movement by this stripper plate. As the jacket 16 continues to be moved downwardly, the pawls 19 push back out of the way of the stripper plate as they go by, and the pallet 18, resting on the stripper plate, holds the newly formed pipe 66 on top of the core, thus effectively stripping the jacket from the pipe as the jacket is lowered into the pit in position for a new molding operation.

The position of the parts as seen in FIG. 3 is when the jacket 16 has almost reached its bottom position during a stripping cycle. The new pipe is left standing on the upper pallet 18 on top of the stripper plate 84, and a lift truck can come in, the fork thereof slid under the pallet (the pallet has three short legs) and be used to carry the new pipe off to the curing room. Then the process will be repeated with the pipe now formed on the pallet 78.

FIGURES 9, 10 and 11 show the construction of the boom header 26 which includes a stationary center post 86 having its lower end permanently mounted on a bed plate 88. At 90 is shown the guy bars for securely anchoring the post 86 to the bed plate 88. The center post 86 acts as the main support for the truss frame 92 which is comprised of a hollow mast 94, a similarly hollow end column 96, a diagonally extending top bar 98 and a lower horizontally oriented swing bar or jib beam 100. The strut 102 and vertical cross bar 104 provide reinforcement for the composite structure of the truss frame 92. The stationary post 86 telescopically engages the mast 94 to permit rotation of the entire truss frame 92 relative to the axis of the stationary post. To facilitate this, there is provided the cylinder 106 having the movable piston end 108 pinned at 110 to the underside of the jib beam 100 and having its opposite stationary end pinned at 112 to the base plate 114 which is welded to the brackets 86a mounting the post 86 on plate 88. Upon actuation of the cylinder 106, the interconnecting linkage which exists between the beam 100 and the plate 114 is shortened and thus causes the entire truss frame 92 to swing outwardly to the dotted line position of FIGURE 9.

The hollow end column 96 constitutes a collar bearing for the header shaft 116 which has the plunger assembly 118 at its lower end. At the upper end of the shaft 116 is the depending cross bracket 120 being connected to the piston end 122 of cylinder 123. Accordingly, the shaft 116 and consequently the plunger assembly 118 may be raised and lowered relative the column 96 as power is supplied by cylinder 123. Tie bars 126 are interconnected between the bracket 120 and the plunger assembly 118.

A standoff 127 is fixedly mounted at the top end of column 96 and is adapted to receive therein the cross bracket 120 and shaft 116 while also providing a means for limiting the axial displacement of the shaft 116 within the end column 96.

The plunger assembly 118 consists of a plunger 130 adapted to form the top end of the pipe and a spider bracket 132 fastened to the top of plunger 130 through the spacer blocks 133. The bracket 132 includes spoke members 134 that extend radially from the center or hub portion thereof. To partially oscillate the plunger assembly 118, and particularly the plunger 130, relative to the axis of the shaft 116 there is shown the parallel spaced apart pitmans 136, each of which are provided with inner and outer ball joints 138 and 140, respectively. The inner ball joints 138 are in driving connection with the reciprocating rods 142 of hydraulic cylinders 144 via the pivoted yoke connectors 145. Cylinders 144 are spaced laterally from jib beam 100 and mounted by the traverse supports 146 which in turn are attached by the tie supports 147. The opposite outer ball joints 140 are shown connected to the pitman connectors 148 consisting of pairs of spaced apart angle members which are fastened to the upper surface of the spoke members 134 of spider bracket 132.

By the linkage of the reciprocating pitmans 136 with the rotatable spider bracket 132 mounted to plunger 130, means is provided for oscillating the plunger about its axis. Note that the reciprocating pitmans are out of phase, i.e. as one is fully extended the other is withdrawn. Note also that one of the pitmans is connected to its respective connector on the spider bracket at a point ahead of the corresponding connection of the opposite pitman. With this arrangement one pitman is pushing while the other is pulling in an opposite direction and the net result is that both are working together to oscillate the plunger assembly. Because of the provision of ball joint connections and the fact that the pitmans 136 extend upwardly from the top of the plunger assembly, the rotary oscillation of the plunger assembly 118 does not interfere with the substantially rectilinear reciprocation of the pitmans. Sufficient free play is built into the linkage to permit the pitmans to deviate slightly as rotational movement is imparted to the plunger assembly.

An accessory to the plunger assembly is a high frequency electric vibrator 150 situated on the vibrator mounting plate 152 which bridges the spoke members 134 near the hub of the spider bracket. The vibrator can be any commercially available unit suitable for the job. Vibratory forces generated by the vibrator are directly transmitted to the spider bracket 132, to the entire plunger assembly 118, and consequently to plunger 130 which ultimately contacts the concrete mix. The vibrator contributes to the effective overall operation of the boom header in achieving the purposes mentioned above.

The overall construction of the boom assembly 26 is better understood when one considers its capability in achieving the several movements necessary to carry out the molding process. The first of these movements is to swing the entire boom header in position above the particular molding station. This is done by merely actuating the cylinder 106 controlling the rotation of the truss frame about the center post 86. Secondly, the plunger assembly 118 is lowered to cause the under surface of plunger 130 to rest in floating engagement with the concrete mix occurring at the top of the mold cavity 17. This is done by actuating the cylinder 123 controlling the vertical displacement of plunger assembly 118. Thirdly, the cylinders 144 are actuated to initiate the oscillation of the plunger 130. Vibrator 150 is also put in operation at this time. After the concrete mix has been consolidated and the top end of the pipe has been formed, the several cylinders are operated to cause their respective pistons to reverse and thus the plunger assembly is raised and the boom header is returned to its original position.

There is thus provided a novel machine for making concrete pipe. Several advantages are manifested by the reduction of the overall working space, the substantial elimination of manual operation, the provision of a versatile boom header capable of servicing several molding stations, and the provision of a machine which fulfills the foregoing listed objectives.

What is claimed is:
1. A machine for molding concrete pipe comprising:
 (a) a stationary core;
 (b) an axially slidable outer jacket in spaced concentric relation outside said core to form an annular molding cavity for receiving the concrete mix;
 (c) a pallet for closing the bottom of the annular opening between the jacket and the core;
 (d) hydraulic power means for axially displacing said jacket together with said pallet and molded pipe to thereby cause the molded pipe to strip from said core, and alternately reversing the axial displacement of said jacket together with said pallet and molded pipe;
 (e) lift means including spring loaded radially slidable pawls for lifting said pallet upon displacing of said jacket; and
 (f) disc means adapted to interrupt only the reverse displacement of said pallet and molded pipe whereby said molded pipe is stripped from said jacket, said disc means being further adapted to disengage said pawls from said pallet upon reverse displacement of said jacket.

References Cited

UNITED STATES PATENTS

| | | | |
|---|---|---|---|
| 2,717,435 | 9/1955 | Livingston et al. | 25—30 |
| 3,119,165 | 1/1964 | Gourlie | 25—30 |
| 3,141,222 | 7/1964 | Steiro | 25—30 |

J. SPENCER OVERHOLSER, *Primary Examiner.*

R. D. BALDWIN, *Assistant Examiner.*